United States Patent [19]

Breslau et al.

[11] Patent Number: 4,986,918
[45] Date of Patent: Jan. 22, 1991

[54] MEMBRANE SEPARATION SYSTEM AND METHOD OF OPERATION

[75] Inventors: Barry R. Breslau, Acton, Mass.; John Slegers, Breda, Netherlands

[73] Assignee: Romicon Inc., Woburn, Mass.

[21] Appl. No.: 433,888

[22] Filed: Nov. 8, 1989

[51] Int. Cl.$^5$ .............................................. B01D 65/02
[52] U.S. Cl. ..................... 210/652; 210/791; 210/321.69; 210/392; 210/425
[58] Field of Search ........ 210/634, 637, 644, 649–654, 210/767, 791, 797, 798, 321.6, 321.69, 332, 333.01; 35/333.1, 391–393, 409, 411, 424, 425, 427, 416.1

[56] References Cited

U.S. PATENT DOCUMENTS 3,352,658  9/1970  Michaels et al. ................... 210/
3,541,005 11/1970  Strathmam et al. ................ 210/
3,549,016 12/1970  Nicholas ........................... 210/
3,556,305  1/1971  Shorr ............................... 117/
3,615,024 10/1971  Micheals .......................... 210/
3,992,301 11/1976  Shippex et al. ............. 210/321.69

Primary Examiner—Frank Sever
Attorney, Agent, or Firm—Mervin E. Brokke; Louis F. Kline

[57] ABSTRACT

An improved separation system and its method of operation for the separation of solutes, colloidal particles, or suspended matter from solutions of suspensions containing the same is disclosed. In a preferred embodiment, this invention relates to a simple and economic membrane filtration system that can be operated in many of the modes of operation of a membrane filtration system, especially suction backwashing, without mixing the filtrate with the feed stream.

10 Claims, 11 Drawing Sheets

MEMBRANE SEPARATION SYSTEM AND METHOD OF OPERATION

FIELD OF THE INVENTION

This invention relates to an improved separation system and its method of operation for the separation of solutes, colloidal particles, or suspended matter from solutions or suspensions containing the same. In a preferred embodiment, this invention relates to a simple and economic membrane filtration system that can be operated in many of the modes of operation of a membrane filtration system without mixing the filtrate with the feed stream.

BACKGROUND OF THE INVENTION

Separation techniques such as reverse osmosis, ultrafiltration and microfiltration are widely used today in industry. Many advantages have been realized by employing these techniques, among which are the reduction in time required for effecting separation, efficiency in separation, the use of mild operating conditions such as room temperature separations, the reduction in operating costs as compared to older techniques such as evaporation, chemical precipitation, and ultracentrifugation, and the capability to separate species previously considered inseparable. The present invention is particularly concerned with membrane separations by ultrafiltration techniques, although it can be applied to some of the other above-mentioned separation techniques.

Ultrafiltration is a separation process wherein a solution or suspension containing a solute, colloidal particle or suspended particle of greater dimensions than the solvent it is dissolved in, is fractionated by being subjected to such pressure as to force the solvent through a porous filter, particularly a polymeric membrane (see for example U.S. Pat. Nos.; 3,615,024; 3,526,588; 3,556,305; 3,541,005; and 3,549,016; all of which are hereby incorporated herein by reference to be generally illustrative of the types of polymeric membranes contemplated), although the filter can be of the nonpolymeric type such as ceramic. The membranes used in ultrafiltration may be of various configurations such as hollow fiber, flat sheet, spiral wound or tubular. Preferably, for the purposes of the present invention, hollow fiber polymeric membranes are employed.

Membrane separation systems are usually operated in a cross-flow mode whereby the process fluid flow (i.e. the "feed stream" to be separated) is tangential to the surface of the polymeric membrane. That is, the process fluid to be treated enters the separation module via the process fluid inlet, flows parallel to the surface of the membrane on the same side as the process fluid inlet and outlet are located, leaves the separation module via the process fluid outlet, and optionally, is recycled back to the separation module for further treatment. A portion of the process fluid passes through the membrane as permeate. This type of separation module may be used for various purposes such as; to concentrate a fluid, in which case the desired product is the fluid leaving the separator through the process fluid outlet; to purify a fluid, in which case the desired product can be the permeate or the fluid leaving the separator through the process fluid outlet; or to separate one or more components from a fluid, in which case the desired product may be the fluid passing through the membrane as permeate, the fluid leaving the separator through the process fluid outlet, the component(s) retained by the membrane, or combination thereof.

During use, the side of the membrane contacting the process fluid can become fouled by material retained by the membrane. Such fouled membranes can be cleaned for reuse by such techniques as; mechanical cleaning, the removal of foulant material by, for example, using a brush, rod or sponge; fast-flush, the pumping of fluid across the fouled surface of the membrane at high flow rate to physically dislodge and remove the foulant; fast-flush with reverse flow, the pumping of fluid across the fouled surface of the membrane at high flow rate with periodic reversal of the flow direction to physically dislodge and remove the foulant; chemical cleaning, the contacting of the fouled surface of the membrane with a chemical cleaning fluid; pressure backwash, the pumping of fluid, for example permeate or water, under pressure through the membrane from the permeate side to the process fluid side such that the fluid physically dislodges and removes foulant material from the surface of the membrane; or a combination of two or more of the above-mentioned techniques.

In the above-described techniques of fast-flush, chemical cleaning and pressure backwashing, pressure is usually created by means of a pump. This can give rise to hydraulic pressure surges that can damage the membrane. Therefore, it is important that the fluid pressure is carefully controlled so the pressure difference between the fluid on one side of the membrane and that on the other side of the membrane does not exceed the maximum allowable transmembrane pressure difference for that particular membrane. The maximum allowable transmembrane pressure difference for a particular membrane is the maximum pressure difference between opposite sides of a membrane that can be accommodated by the membrane without damage resulting.

Certain membrane configurations with narrow process fluid flow paths may become severely fouled, whereby the foulant restricts or even prevent the free flow of process fluid across the membrane surface. If this occurs, the fast-flush and chemical cleaning techniques may be insufficient to adequately clean the membrane, and mechanical cleaning and/or pressure backwashing may be required to achieve satisfactory cleaning. However, mechanical cleaning may be impractical for these membrane configurations because of their narrow process fluid flow paths, and pressure backwashing, as discussed above, has the disadvantages of; having to carefully control the pressure of the fluid in order to avoid damage to the membranes; and the addition of extra pumping capacity which adds to both the initial cost of the system and to the overall operating cost of the system.

The system design described in copending U.S. patent application Ser. No. 331,471 and the operation of this system described in copending U.S. patent application Ser. No. 331,476 (both commonly assigned to the same assignee as the present invention) presumably solves the problem of hydraulic pressure surges leading to damaged fibers. A suction backwash procedure is described in the above-mentioned patent applications to aid in the cleaning of the membranes. To activate the suction backwash procedure, a permeate pump is used to draw permeate through the hollow fibers by way of the process lines. While otherwise an improvement to the systems available heretofore, there are several problems and limitations to this design. First, the system described in U.S. patent application Ser. No. 331,471 is very complex, more costly than necessary and requires at least two pumps of equal size, one process pump, and one permeate pump. This additional pumping capacity not only adds cost to the initial system construction, but also increases the energy requirement during operation. Secondly, because the process fluid comes into contact with the permeate pump and associated permeate lines, the permeate lines and permeate pump become contaminated with the process fluid. This limits the possible applications of this design. After use of the suction backwash procedure and prior to operation in the standard mode, the system must be recleaned and/or resterilized.

An essential part of many separation techniques, as in membrane filtration, is the ability to keep the filtrate separate from the feed and therefore avoid mixing the permeate with the process fluid. This is beneficial in applications where the filtrate stream must remain sanitary, such as in food or pharmaceutical applications, or where the feed stream can contaminate the filtrate, such as in waste applications.

SUMMARY OF THE INVENTION

It is the object of the present invention to provide a novel, simple and economical separation system that reduces the equipment and/or energy requirements associated with such systems and is capable of operating in many of the modes of operation of a separation system, including suction backwash, while keeping the filtrate stream separate from the process stream.

BRIEF DESCRIPTION OF THE DRAWINGS

This invention will now be more fully explained with reference to FIGS. 1-9 appended hereto.

DETAILED DESCRIPTION OF THE INVENTION

A novel, simple and economical membrane separation system is described herein which can operate in many of the standard modes of operating a membrane separation system such as: (a) normal flow of the process side fluid during filtration; (b) reverse flow of the process side fluid during filtration; (c) normal flow of the process side fluid during filtration with filtrate recycle, the isolation and return of the filtrate to the process side; (d) reverse flow of the process side fluid during filtration with filtrate recycle; (e) suction backwash with the backwash liquor exiting the process side flow channels simultaneously in the normal flow and reverse flow directions; (f) suction backwash with the backwash liquor exiting the process side flow channel in the normal flow direction; (g) suction backwash with the backwash liquor exiting the process side flow channel in the reverse flow direction. Furthermore, this invention allows for the economical operation in many of the operating modes, especially in the suction backwash mode, without requiring the suction backwash fluid to contact and contaminate the filtrate fluid with process fluid debris.

The process side of the membrane module is the side where the process fluid comes into contact with the membrane surface. The process fluid is carried to the process side of the membrane module by way of the process fluid conduit. Upon leaving the membrane module the process fluid has lost a portion of its solvent as permeate, and therefore as the process fluid leaves the membrane module it is more concentrated in the components of larger size than the pores of the membrane. As used herein, the term "permeate" refers to the stream passing through the membrane surface and the term "concentrate" defines the portion of the stream exiting the membrane module on the process side containing the retained, non-permeating species. The concentrate is carried away from the module in the concentrate fluid conduit.

A separation module as discussed herein includes conventional membrane cartridges such as containers housing membranes within a solid outer wall having one or more permeate outlets. The solid outer wall is so spaced from the membranes as to enable the permeate to collect and surround the membrane. The cartridges can be connected with a process fluid inlet, concentrate outlet, and a conduit for discharge of the permeate or if no conduit for the permeate is used, the permeate can flow into a tank surrounding the cartridge. A single cartridge can be used or multiple cartridges can be connected to a manifold to allow for the cartridges to be run in series and/or parallel configuration. Alternately, the solid outer wall of the cartridge described above can be eliminated, the cartridges suspended in a tank, and the permeate allowed to flow into said tank which surrounds the membrane module or modules. The permeate is then subsequently carried off.

Figure 3:
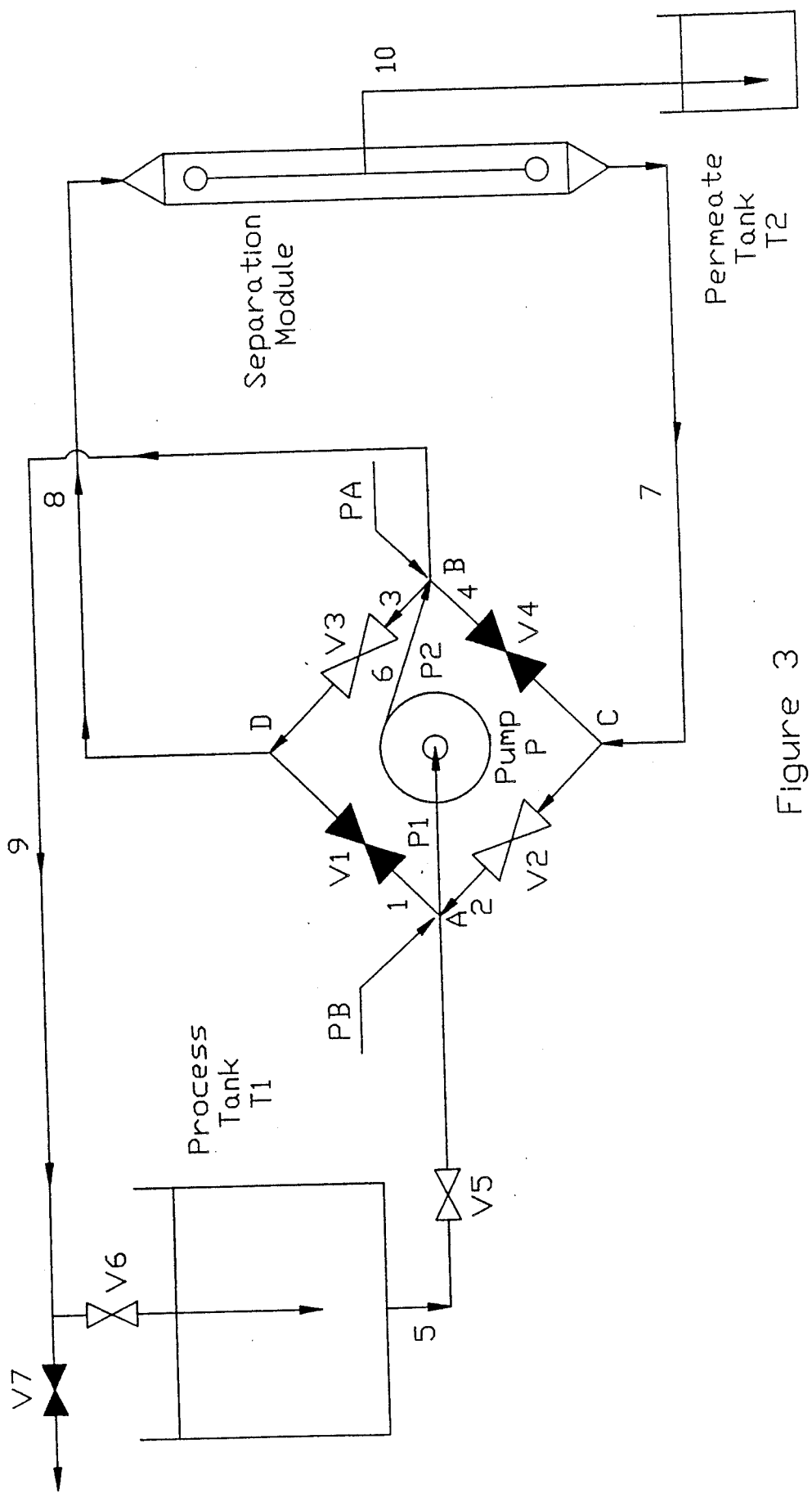
FIG. 3 is a schematic representation of the separation system of this invention operating in the normal flow mode.

Referring to FIG. 3, the membrane separation system of this invention places the process pump P, having an inlet P1 and an outlet P2, within a network of valved conduits comprising a conduit loop connected in such a manner as to allow the use of at least all the operating modes described above, including suction backwash, while keeping the filtrate stream completely separate from the feed stream. This process can best be described by the figures, and by comparing the system of this invention to standard membrane filtration systems.

Figure 1:
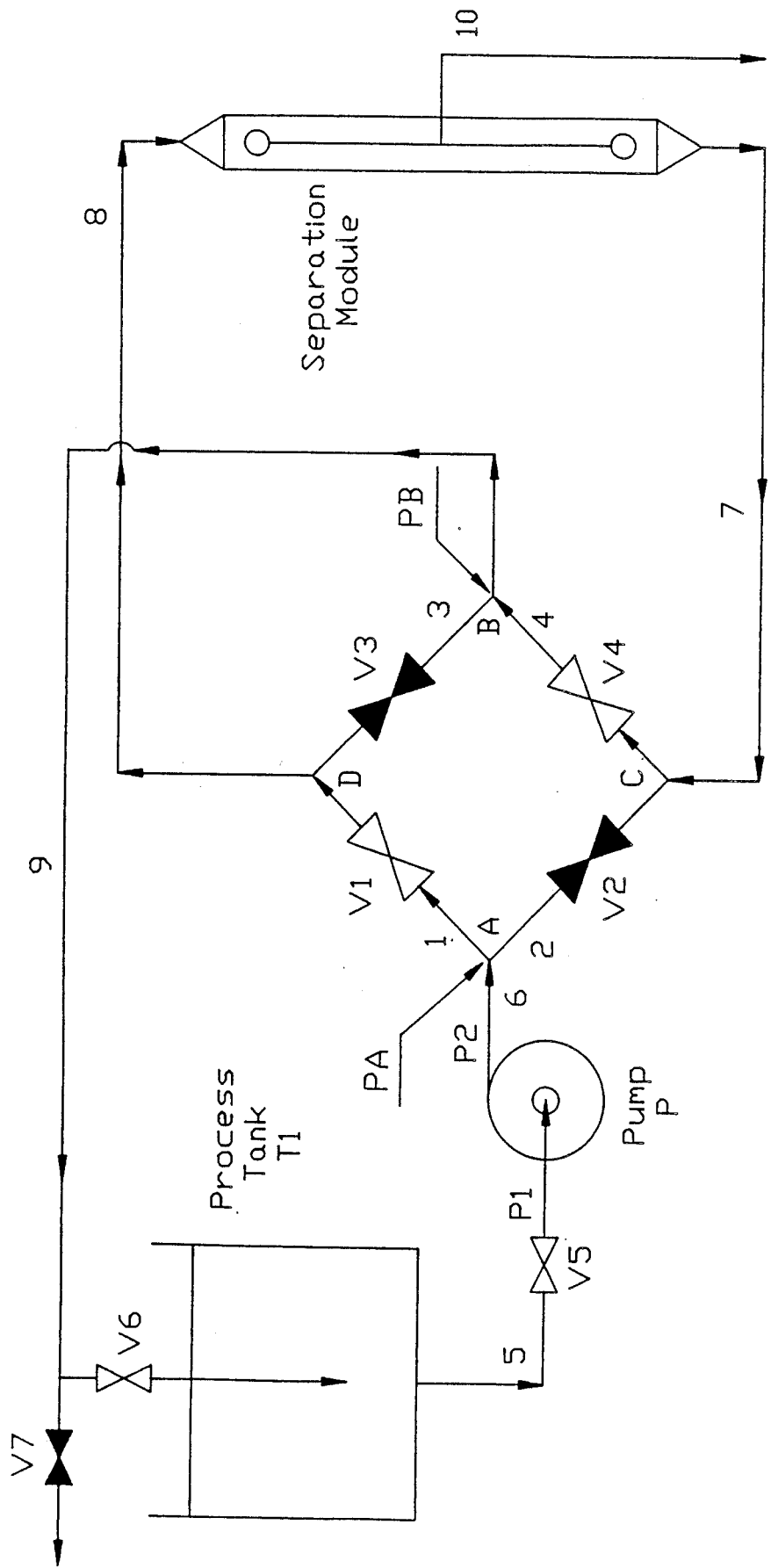
FIG. 1 is a schematic representation of a currently available system, (the prior art), operating in the normal flow mode.

FIG. 1 is a simplified schematic representation of a currently available system (the prior art) operating in the normal flow mode, (a). The process fluid flows from tank T1, through valved conduit 5, through pump P and into a valve network containing four valves, V1 to V4. Valves V1 and V4 are open and valves V2 and V3 closed. The process stream then flows through valved conduit 1, through conduit 8, and to the separation module inlet. The process fluid passes through the separation module, through conduit 7 as concentrate, re-enters the valve network, flows through valve V4 and exits through conduit 9. The concentrate can exit the system via conduit 9 through valve V7 (shown closed), return to the process tank T1 through valve V6, or a combination of both. The pressure at the pump discharge and the inlet to the valve network is designated PA, while the pressure at the outlet of the valve network is designated PB. Also, the stream exiting through conduit 9 is at lower pressure, PB. In all cases of standard operation, PA is greater than PB. The rate of flow through the separation module is determined by the pressure difference across the separation module which is determined by valves V1 and V4. Filtrate produced in the separation module exits through conduit 10.

Figure 2:
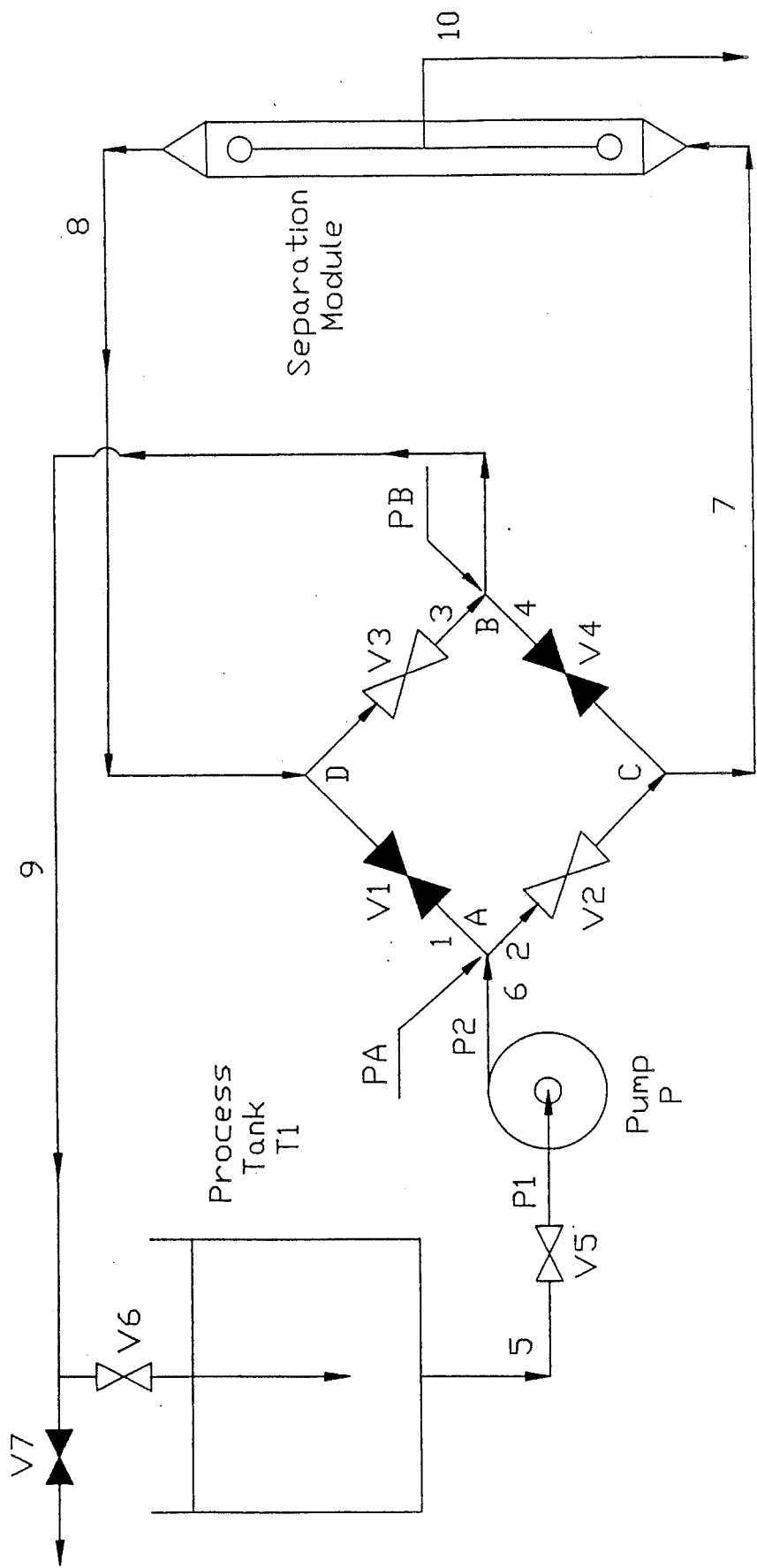
FIG. 2 is a schematic representation of a currently available system, (the prior art), operating in the reverse flow mode.

The direction of the flow shown in FIG. 1 can be reversed by closing valves V1 and V4 and opening valves V2 and V3. This is shown in FIG. 2 which is a standard system (the prior art) operating in the reverse flow mode, (b), as compared to the system shown in FIG. 1. In FIG. 2 the process fluid flows into the separation module through conduit 7 and exits the separation module through conduit 8.

The simplified schematic drawing shown in FIG. 3 depicts the inventive concept of the present application. The process pump is placed within a valved conduit network, or loop, allowing the separation system to be operated in at least all the modes described above, (a)–(g), without any additional valves or pumps. In FIG. 3, the process fluid contained in tank T1, flows through valved conduit 5, past conduit junction A, and enters the inlet of pump P at P1. As used herein, a conduit junction is defined as a point or place within a system where the flow conduits connect or converge, but not necessarily at a single point. The process fluid is then discharged from pump P at P2, flows past conduit junction B, through valved conduit 3, past conduit junction D, and through conduit 8 to the separation module. The process fluid flows through the process side of the module, returns to the conduit loop at conduit junction C through conduit 7 as concentrate, flows through valve V2, through conduit junction A, whereby it is mixed with process fluid from tank T1 and returns back to the inlet of the pump P1. A portion of the mixed concentrate/process stream may be bled off at conduit junction B, through valve V6 in conduit 9 and returned to the process tank T1. The stream in conduit 9 is at elevated pressure, PA.

Figure 4:
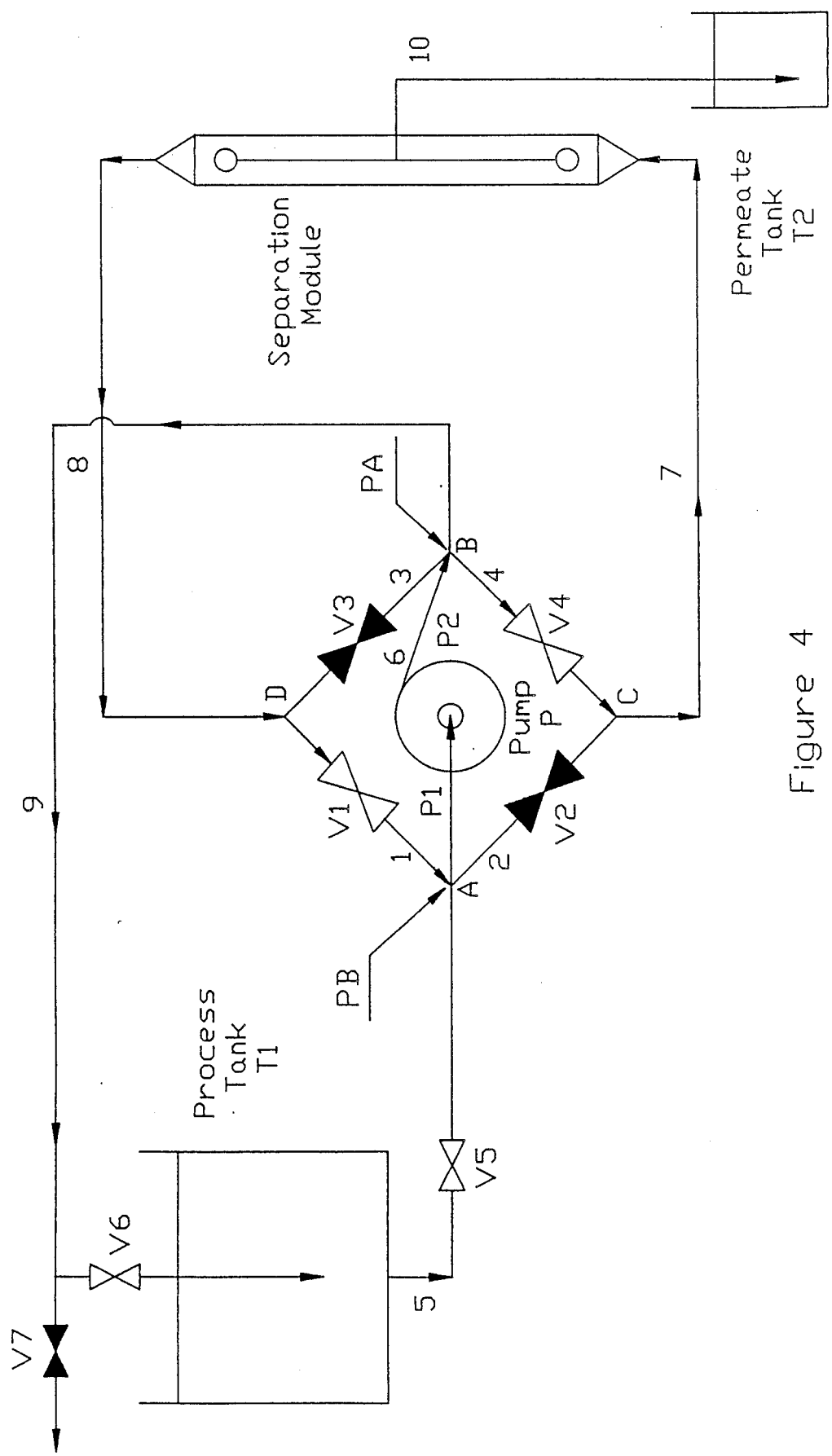
FIG. 4 is a schematic representation of the separation system of this invention operating in the reverse flow mode.

Flow reversal is achieved by opening valves V1 and V4 and closing valves V2 and V3. This is depicted in FIG. 4. The process fluid flow is identical to that shown in FIG. 3 up to conduit junction B. In the reverse flow mode the process fluid flows from conduit junction B to conduit junction C via valved conduit 4. It then flows through conduit 7 to the separation module. The process fluid flows through the process side of the module, returns to the conduit loop at conduit junction D through conduit 8 as concentrate, flows through valve V1 and through conduit junction A. The remainder of the process in now identical to normal flow.

FIGS. 3 and 4 demonstrate the normal and reverse flow modes of operation (a) and (b). As shown in these figures, the permeate from the module can flow via conduit 10 to a separate tank, T2, or alternately where the module contains no outer shell or no conduit for the permeate, the permeate can flow to a tank in which the module is submerged (not shown).

The modes of operation described in FIGS. 3 and 4 are similar to those described using the conventional systems of FIGS. 1 and 2. However, in the system of this invention the process stream exits the valve network at higher pressure, PA, than in the conventional systems, where the process stream exits the valve network at lower pressure PB. This has the advantage of enabling the concentrated process stream to return to a distant feed tank or reservoir for further concentration or to be passed through a filter, such as a bag or cartridge type filter, to remove debris from the stream, debris removed from the membrane during cleaning.

Figure 5:
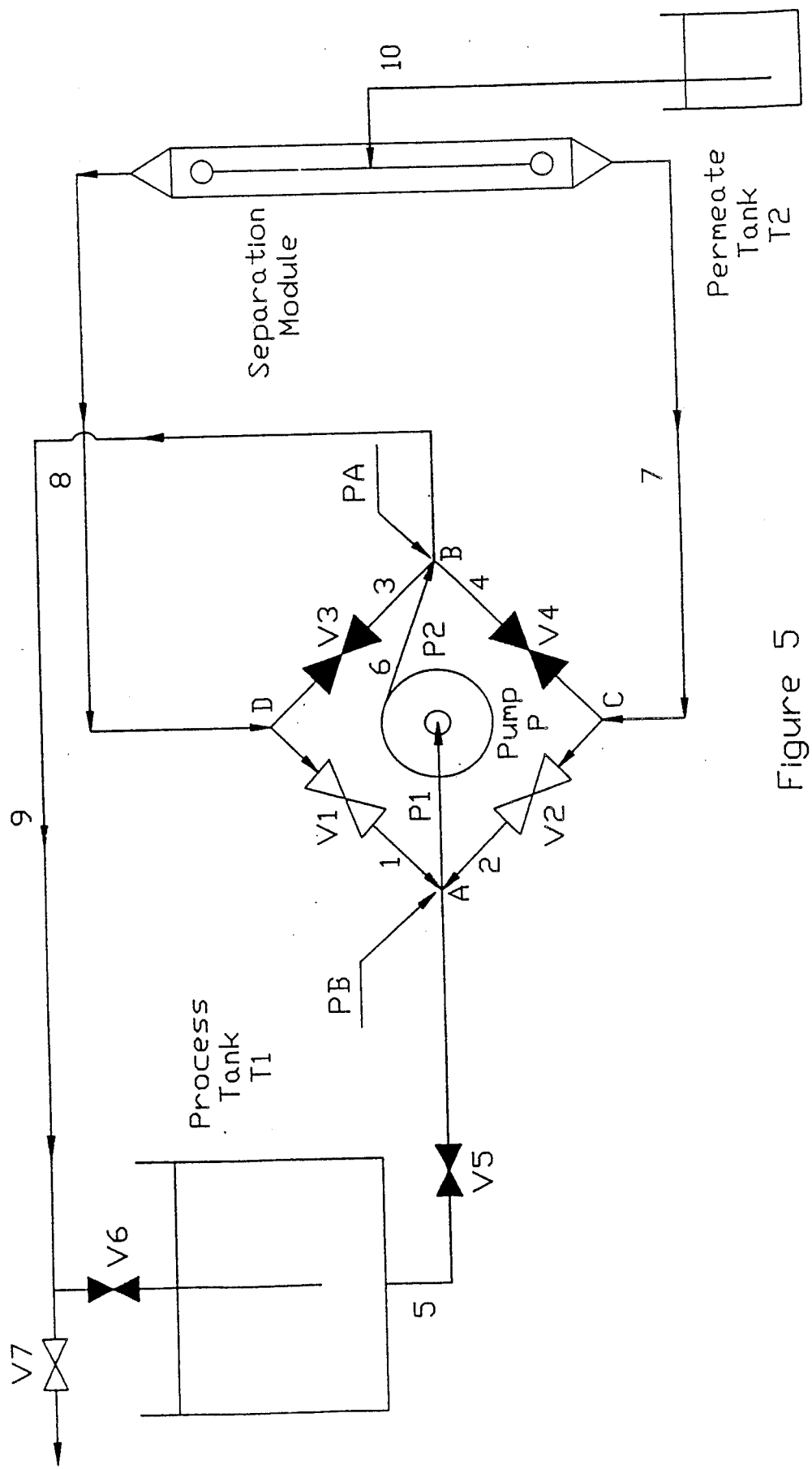
FIG. 5 is a schematic representation of the separation system of this invention operating in the suction backwash mode with the backwash liquor exiting the process side flow channels simultaneously in the normal flow and reverse flow directions.

FIG. 5 depicts the system of this invention operating in the suction backwash mode with the backwash liquor exiting the process side flow channels simultaneously in the normal flow and reverse flow directions, (e). This is accomplished by opening valves V1, V2 and V7 and closing valves V3, V4, V5 and V6. The process pump P provides suction or negative pressure to the process side of the separation module by way of conduit 7 and 8, allowing filtrate to flow from tank T2, via conduit 10, through the membrane and into the process side of the separation module. From the process side of the separation module, the backwash liquor flows through conduit 7 (normal flow) and conduit 8 (reverse flow). The backwash liquor that flows through conduit 8 flows to conduit junction D, through conduit 1 to conduit junction A, into pump P via pump inlet P1, is discharged from pump P at pump outlet P2, to conduit junction B and is discharged from the system via conduit 9 and valve V7. The backwash liquor flowing through conduit 7 flows to conduit junction C, through conduit 2 to conduit junction A where it joins the backwash liquor from the reverse flow as described above. When the backwash fluid exits the cartridge, it is constrained to the process side piping network. Therefore, foulant, plugs, and debris do not interfere or contaminate filtrate lines.

Figure 6:
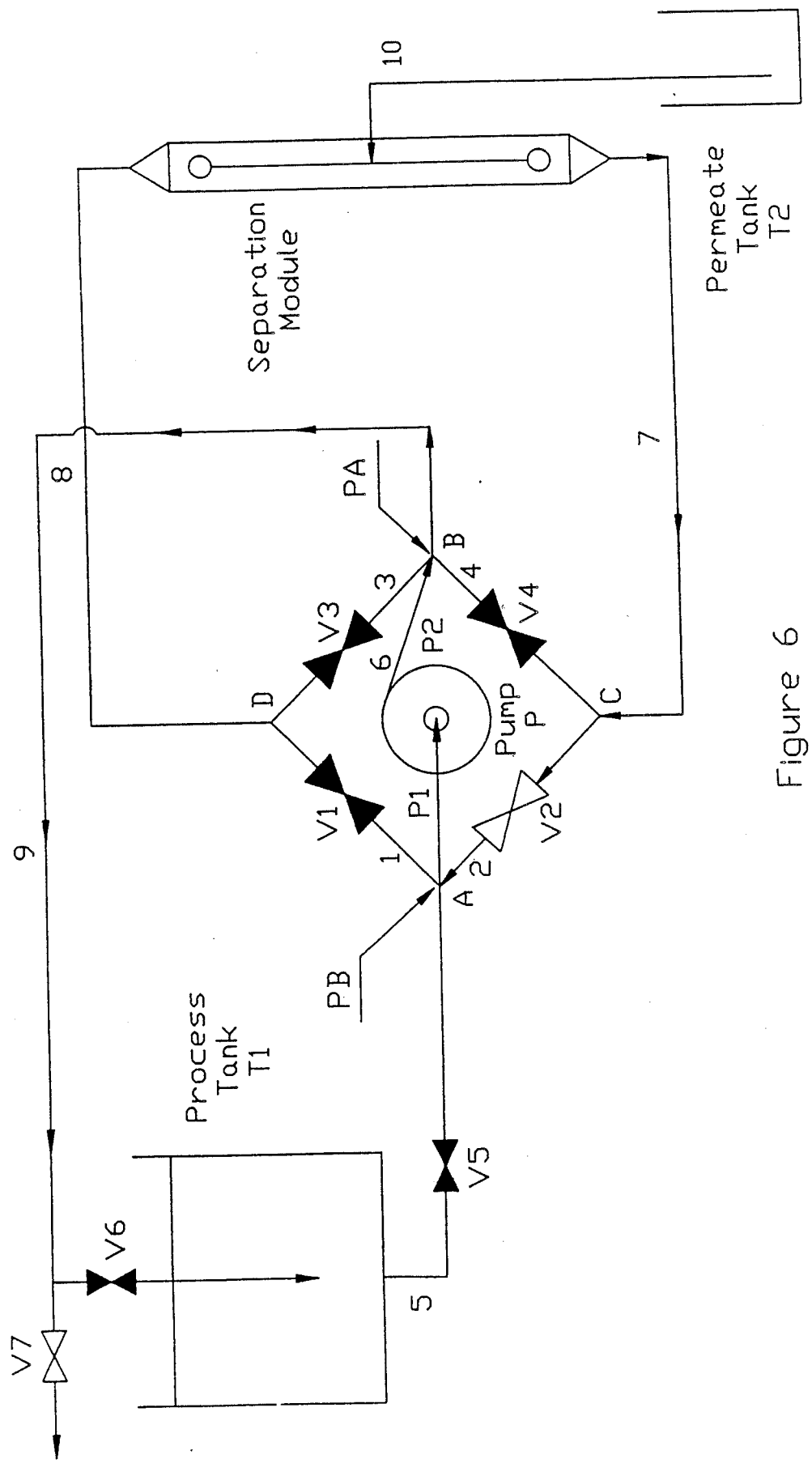
FIG. 6 is a schematic representation of the separation system of this invention operating in the suction backwash mode with the backwash liquor exiting the process side flow channel in the normal flow mode.
Figure 7:
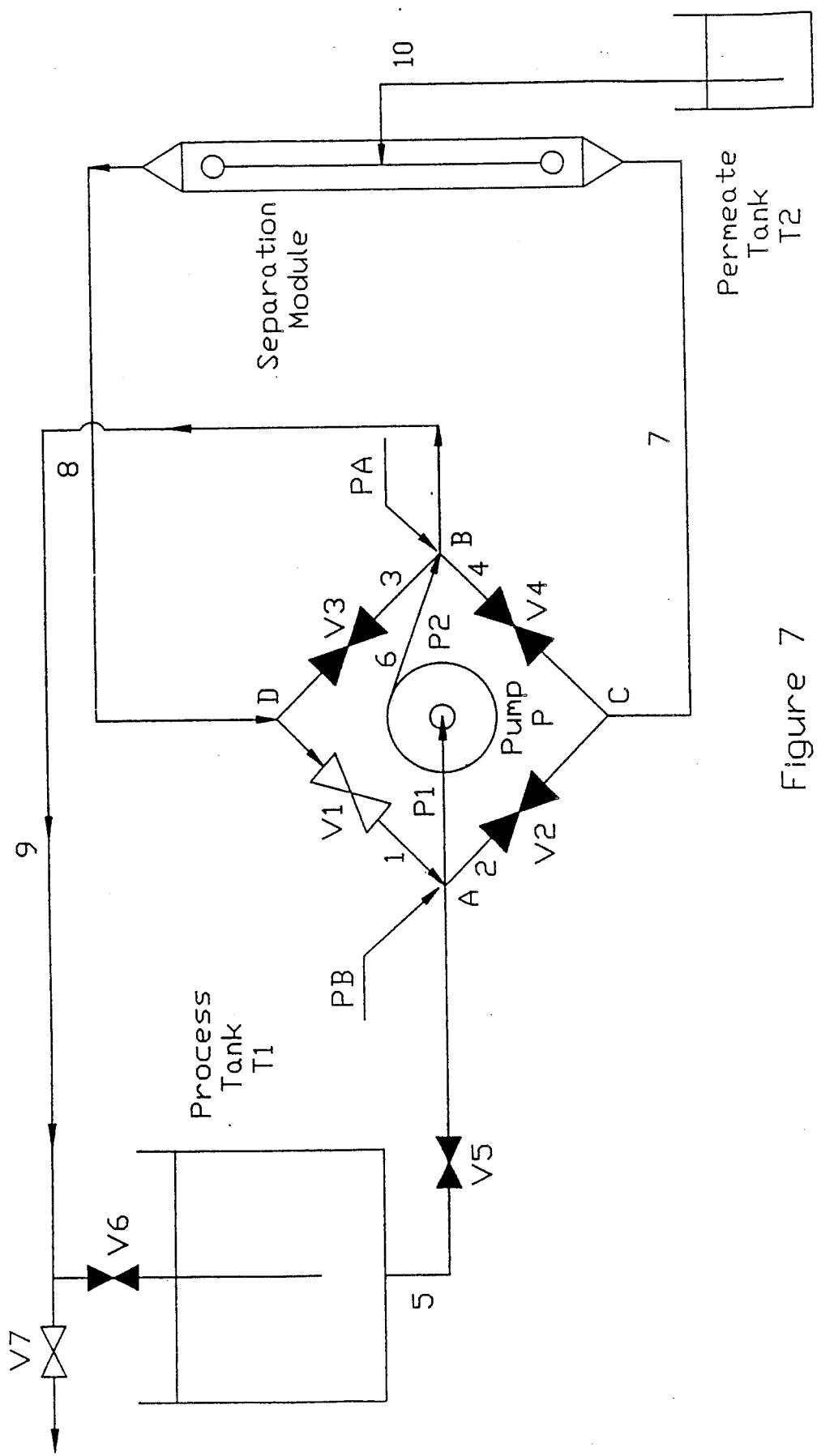
FIG. 7 is a schematic representation of the separation system of this invention operating in the suction backwash mode with the backwash liquor exiting the process side flow channel in the reverse flow mode.

FIG. 6 depicts the system of this invention operating in the suction backwash mode with the backwash liquor exiting the process side flow channel in the normal flow direction, (f). This is accomplished by closing all the valves except valves V2 and V7. The backwash liquor flows from the process side of the separation module via conduit 7 to conduit junction C, via conduit 2 to conduit junction A, into pump P via pump inlet P1, is discharged from pump P at pump outlet P2, to conduit junction B and is discharged from the system via conduit 9. This process can be reversed and suction backwashing can take place in the reverse mode of operation, (g), as shown in FIG. 7 whereby all valves are closed except valves V1 and V7.

Figure 8:
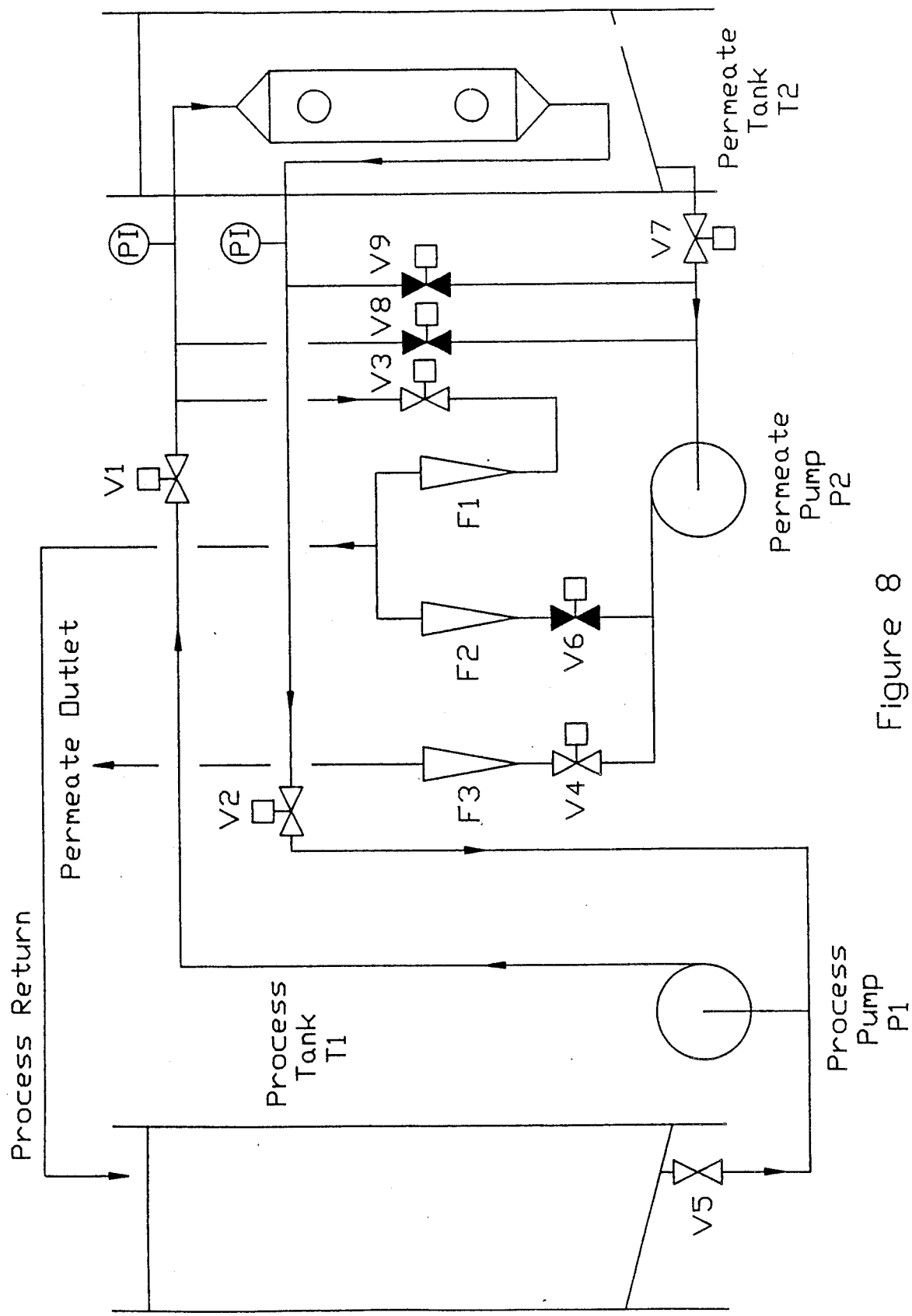
FIG. 8 is a schematic representation of the separation system of copending U.S. patent application Ser. No. 331,471 operating in the normal flow mode.
Figure 9:
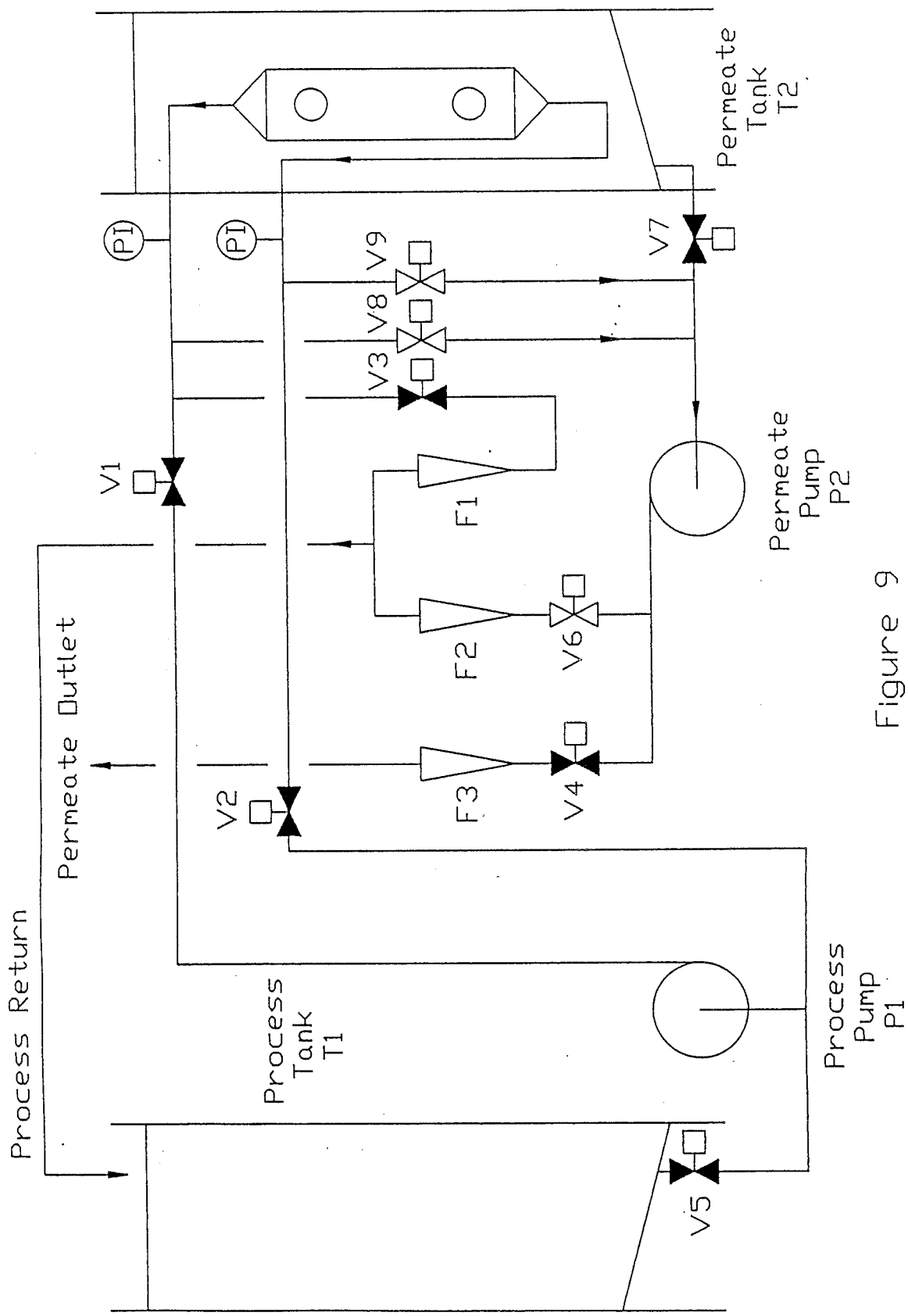
FIG. 9 is a schematic representation of the separation system of copending U.S. patent application Ser. No. 331,471 operating in the suction backwash mode with the backwash liquor exiting the process side flow channels simultaneously in the normal flow and reverse flow directions.

For further comparison, FIG. 8 depicts the system of U.S. application Ser. No. 331,471 in the normal mode of operation, (a). The system of U.S. application Ser. No. 331,471 requires two pumps of equal size for the system to be run, a process pump and a permeate pump. When suction backwash is used in the system of U.S. application Ser. No. 331,471, as shown in FIG. 9, the permeate pump provides the suction or negative pressure on the fibers, draws permeate from the container the cartridges are submerged in, and the permeate passes through the fibers. All foulants, plugs and contaminants contained in the fibers and on the membrane surface are now exposed to the permeate pump and associated permeate lines, causing said lines to become contaminated with process fluid and foulants. As stated above, in applications such as pharmaceutical, dairy, or waste, this would necessitate the re-sterilization or recleaning of the permeate lines and permeate pump.

As described above, the system of the current invention only requires a single process pump to operate both in the normal modes of operation and in the suction backwash mode, therefore, no cross-contamination takes place. Besides this advantage of no cross-contamination, the system of the current invention can be manufactured for a substantial reduction in cost and can operate with a substantial reduction in energy consumption as compared to the system of U.S. application Ser. No. 331,471. A comparison of the two systems is shown in the example below.

EXAMPLE 1

Comparative

The cost and power requirements of the system of the present invention were compared to the cost and power requirements of the system described in U.S. application Ser. No. 331,471. The data are presented in Table 1 below as percentages of the cost and power requirements of the system described in U.S. application Ser. No. 331,471. Each system was designed to produce 20 gallons a minute of high quality filtered water from a specific city water feed by using 200 sq. ft. of an 80,000 molecular weight cutoff membrane.

TABLE 1

| Item | Cost Reduction |
|---|---|
| piping and tanks | 63% |
| pumping | 61.5% |
| total capital costs | 63% |
| power required | 55% |

EXAMPLE 2

The system of the present invention, equipped with two types of hollow fiber membrane cartridges (Romicon HF25-43-CM50 and HF25-43-XM50) was used to treat a metal plating waste containing suspended solids and zinc. Both types of membranes gave rejection coefficients in the 98% range over the course of a three day study. During this study a concentration factor of 1250X was achieved, that is for every 1250 gallons of feed (waste water), 1249 gallons of filtrate were produced.

The analytical data collected during this study are shown in Table 2.

TABLE 2

| SAMPLE | Suspended Solids ppm | Zinc ppm |
|---|---|---|
| feed A | 686 | 3.2 |
| feed B | 1,286 | 179 |
| CM permeate A | 18.4 | 0.07 |
| CM permeate B | 13.2 | 0.05 |
| CM rejection coefficient | 98.2% | 98.9% |
| XM permeate A | 25.0 | 0.16 |
| XM permeate B | 13.2 | 0.08 |
| XM rejection coefficient | 97.8% | 97.5% |

Figure 10:
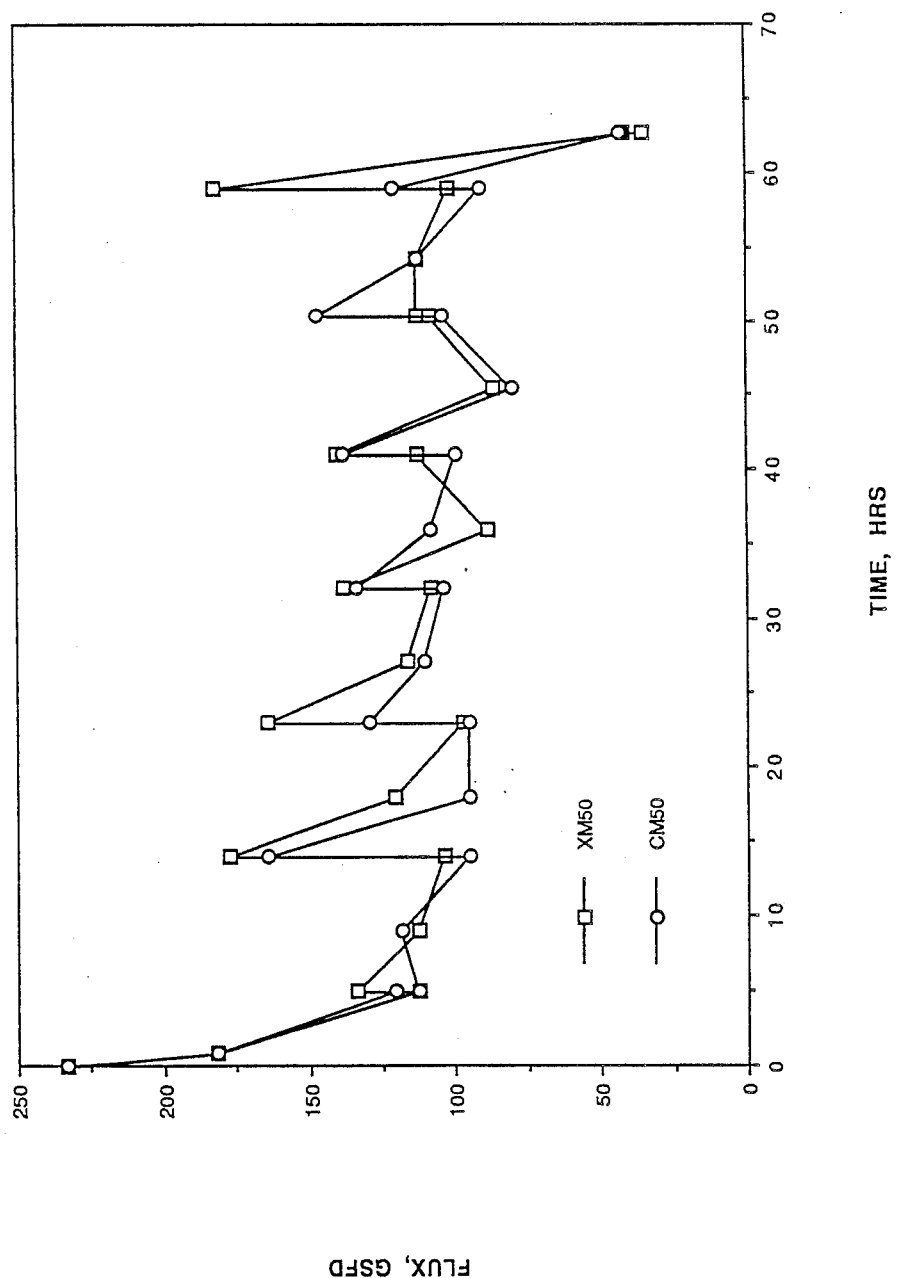
FIG. 10 is a graph of the flux rate generated during operation of a system of this invention versus the running time.
Figure 11:
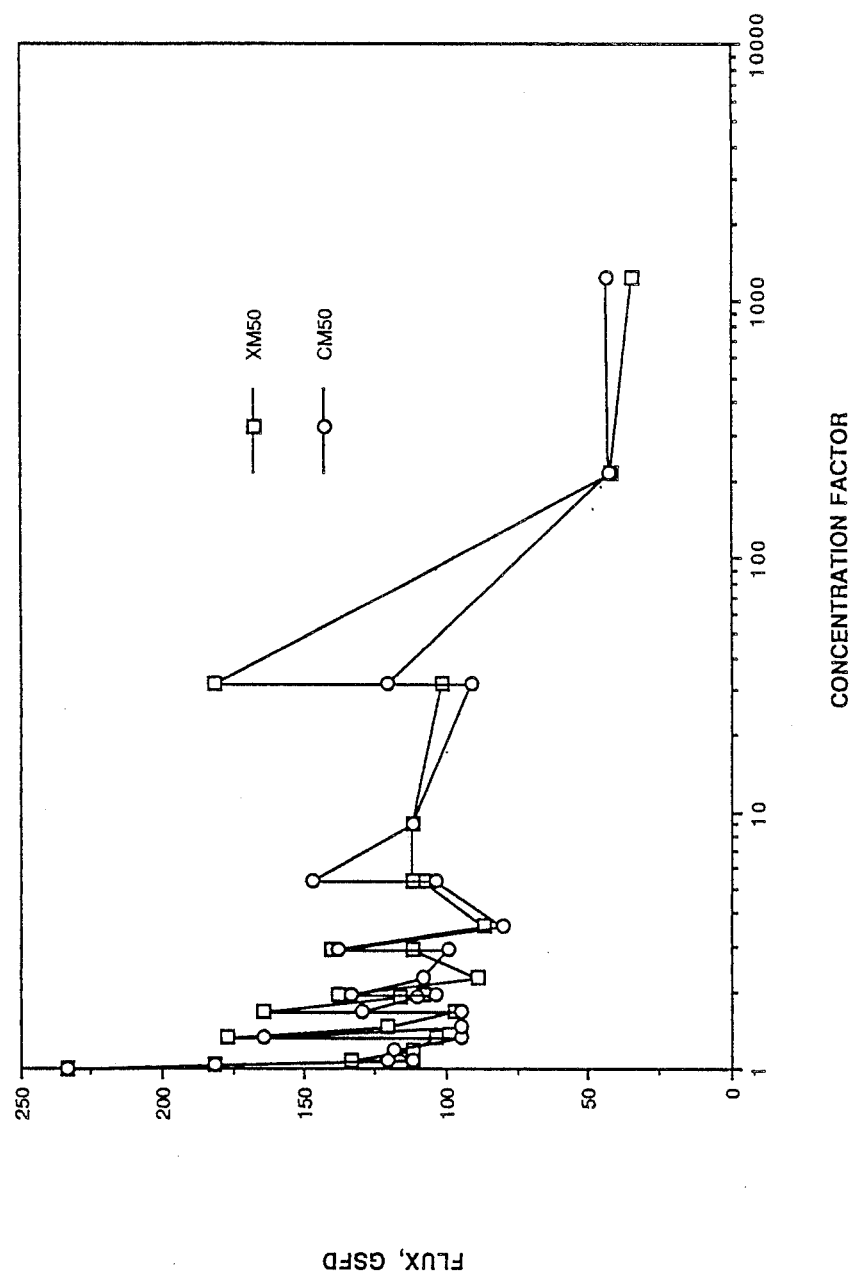
FIG. 11 is a graph of the flux rate generated during operation of a system of this invention versus concentration factor.

The filtration rate in the form of fluxes (gallons filtrate/area/time, gallons/sq. ft./day) is shown as a function of time in FIG. 10 and as a function of concentration factor in FIG. 11. The "saw tooth" pattern in both figures is the result of the suction backwash operation, demonstrating how the membranes were sufficiently cleaned during processing to restore the filtrate rate close to its initial value without the need for a shutdown or an external cleaning step.

We claim:

1. An apparatus for conducting separations comprising:
   (a) one or more separation modules;
   (b) a pressure means with an inlet and an outlet, said pressure means connected to a loop comprised of four conduit junctions A, B, C and D connected together by four valved conduits and junction A is connected to junctions D and C and is further connected to a valved inlet feed stream conduit and a conduit to the inlet of said pressure means, junction B is connected to junctions D and C and is further connected by conduit to the outlet of said pressure means and to a valved discharge conduit, junction D is connected to junctions A and B and is further connected by conduit to one end of the separation module on the process side, and junction C is connected to junctions A and B and is further connected to the second end of the separation module on the process side and said loop is for introducing fluid under positive pressure in both forward flow and reverse flow directions to said separation modules and for providing negative pressure on the inlet and outlet side of said separation modules; and
   (c) a means to take off permeate from said separation modules.

2. The apparatus of claim 1 wherein said separation module is an ultrafiltration membrane separation module.

3. The apparatus of claim 1 wherein said separation module is a microfiltration separation module.

4. The apparatus of claim 1 wherein said separation module contains hollow fiber ultrafiltration membranes.

5. The apparatus of claim 1 wherein said separation module contains hollow fiber microfiltration membranes.

6. A method of separating solutes, colloidal particles and suspended matter from a solution or suspension of such matter comprising:
   (a) connecting a pump to a loop comprised of four conduit junctions A, B, C and D connected together by four valved conduits and junction A is connected to junctions D and C and is further connected to a valved inlet feed stream conduit and a conduit to the inlet of said pump, junction B is connected to junctions D and C and is further connected by conduit to the outlet of said pump and to a valved discharge conduit, junction D is connected to junctions A and B and is further connected by conduit to one end of separation module on the process side, and junction C is connected to junctions A and B and is further connected to the second end of said separation module on the process side;

(b) pumping said solution or suspension into said valved conduit loop at conduit junction B, out of said valved conduit loop at conduit junction D, through said separation module and back to said valved conduit loop at conduit junction C;

(c) reversing the flow by pumping said solution or suspension into said valved conduit loop at conduit junction B, out of said valved conduit loop at conduit junction C, through said separation module and back to said valved conduit loop at conduit junction D;

(d) recovering concentrate containing solutes, colloidal particles or suspended matter;

(e) withdrawing permeate from said separation module; and (f) cleaning said separation module by applying negative pressure to the process side of said separation module and thereby drawing filtrate from the filtrate side of said separation module into the process side of said module, into said valved conduit loop at conduit junction D, conduit junction C or a combination thereof, through valved conduit junction A, into said pump and out of said valved conduit loop at conduit junction B.

7. The method claim 6 wherein said separation modules are ultrafiltration separation modules.

8. The method claim 6 wherein said separation modules are microfiltration separation modules.

9. The method claim 6 wherein said separation modules are hollow fiber ultrafiltration separation modules.

10. The method claim 6 wherein said separation modules are hollow fiber microfiltration separtion modules.

* * * * *